(12) United States Patent
Hartmann et al.

(10) Patent No.: US 6,980,901 B2
(45) Date of Patent: Dec. 27, 2005

(54) METHOD AND DEVICE FOR OPERATING AN INTERNAL COMBUSTION ENGINE

(75) Inventors: Dirk Hartmann, Stuttgart (DE); Henri Barbier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/934,021

(22) Filed: Sep. 3, 2004

(65) Prior Publication Data

US 2005/0065705 A1   Mar. 24, 2005

(30) Foreign Application Priority Data

Sep. 4, 2003 (DE) ................. 103 40 816

(51) Int. Cl.[7] ............................................. G06G 7/70
(52) U.S. Cl. .................................................... 701/101
(58) Field of Search ................. 701/101–105, 701/110, 111

(56) References Cited

U.S. PATENT DOCUMENTS

| 6,283,093 B1 * | 9/2001 | Lautenschuetz et al. ............ 123/406.33 |
| 6,681,573 B2 * | 1/2004 | Arnold ........................ 60/602 |
| 2003/0055578 A1 * | 3/2003 | Hartz et al. .................. 702/35 |
| 2003/0145591 A1 * | 8/2003 | Arnold ........................ 60/602 |
| 2004/0089085 A1 * | 5/2004 | Naude ........................ 74/116 |

\* cited by examiner

*Primary Examiner*—John T. Kwon
(74) *Attorney, Agent, or Firm*—Kenyon & Kenyon

(57) ABSTRACT

A method and a device for operating an engine, in particular of a vehicle, avoid a jump of an output variable of the engine and therefore a jolt of the internal combustion engine in specific operating states of the engine. In this case, the output variable of the internal combustion engine is set within a predefined range. At least a part of the predefined range for setting the output variable is blocked as a function of at least one operating state of the internal combustion engine.

12 Claims, 5 Drawing Sheets

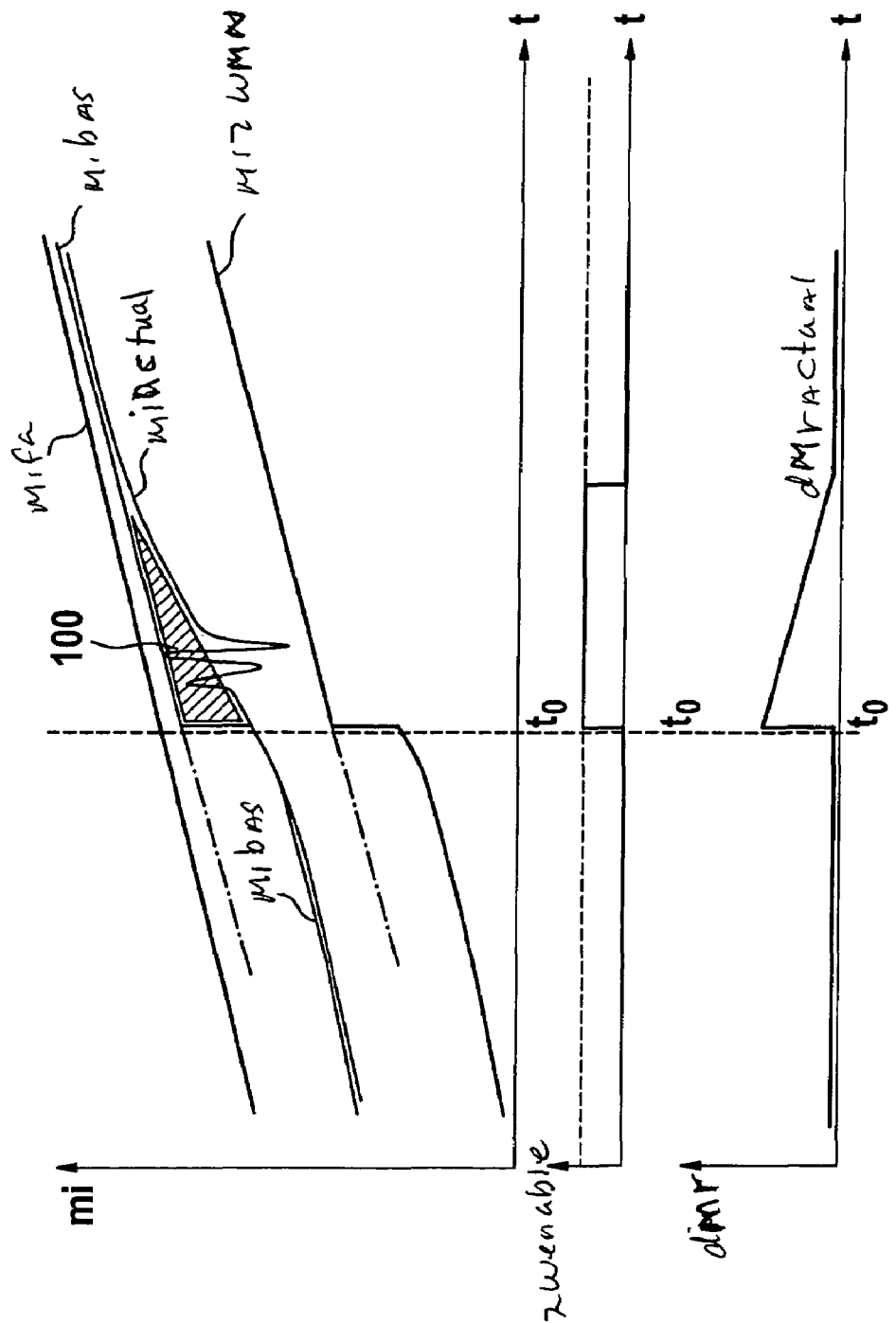

METHOD AND DEVICE FOR OPERATING AN INTERNAL COMBUSTION ENGINE

BACKGROUND INFORMATION

Methods and devices for operating an internal combustion engine, in which an output variable of the internal combustion engine, such as a torque, is set within a predefined range and/or is limited to a predefined range, are already known. This delimitation results, for example, from the most advanced and the most retarded possible ignition angles.

SUMMARY OF THE INVENTION

The method according to the present invention and the device according to the present invention have the advantage over the related art that at least a part of the predefined range for setting the output variable is blocked as a function of at least one operating state of the internal combustion engine. In this way, it may be ensured that the output variable does not change in an undesired way within the predefined range for the at least one operating state, for example, in order to maintain a function of the internal combustion engine which characterizes the at least one operating state or in order to avoid an undesired jolt of the internal combustion engine in the event of a change of the operating state and thus to provide greater comfort.

It is advantageous in particular if the at least one operating state is formed by a catalytic converter heating function. In this way, it may be ensured that the predefined range for the output variable is only permitted in a range for setting the output variable which ensures that the catalytic converter heating function is maintained.

A further advantage results if the at least one operating state is formed by a valve lift changeover. In this way, it may be ensured that the predefined range for the output variable, which changes suddenly in this case, does not result in a jump of the output variable itself, so that greater comfort is achieved.

A further advantage results when, if the at least one operating state occurs, a reserve for the output variable is increased and this reserve is blocked for the setting of the output variable. In this way, the range forbidden to the output variable for the at least one operating state may be implemented and made available in a particularly simply manner to the output variable upon leaving the operating state.

It is advantageous in this case if the reserve is increased or reduced as a function of the shape of the curve of the output variable over time. In this way, a sudden change in the output variable may be avoided upon changing the operating state and/or setting a new operating state.

The reserve may be reduced in a particularly simply manner using a ramp function or a filter.

Furthermore, it is advantageous if the at least one operating state is predicted. In this way, the blocked and/or forbidden range for setting the output variable may be increased early using a reserve, for example, so that it is available in a timely manner and in a sufficient amount for the at least one operating state.

A further advantage results if a dynamic intervention of the output variable in the blocked part of the predefined range for the output variable is permitted. In this way, interventions of the output variable which are relevant to safety or comfort for the operation of the internal combustion engine, such as an anti-jolt function, may be implemented in particular, even if they intervene in the blocked part of the predefined range for the output variable.

A further advantage results if a manipulated variable for implementing a setpoint value for the output variable is also limited to a predefined range. In this way, the implementation of requirements for the output variable which are not implementable may be prevented.

BRIEF DESCRIPTION OF THE DRAWINGS

FIG. 5a) shows a third curve of a torque over time.

FIG. 5b) shows a third curve of an ignition angle release over time.

FIG. 5c) shows a third curve of a blocked torque range over time.

DETAILED DESCRIPTION

Figure 1:
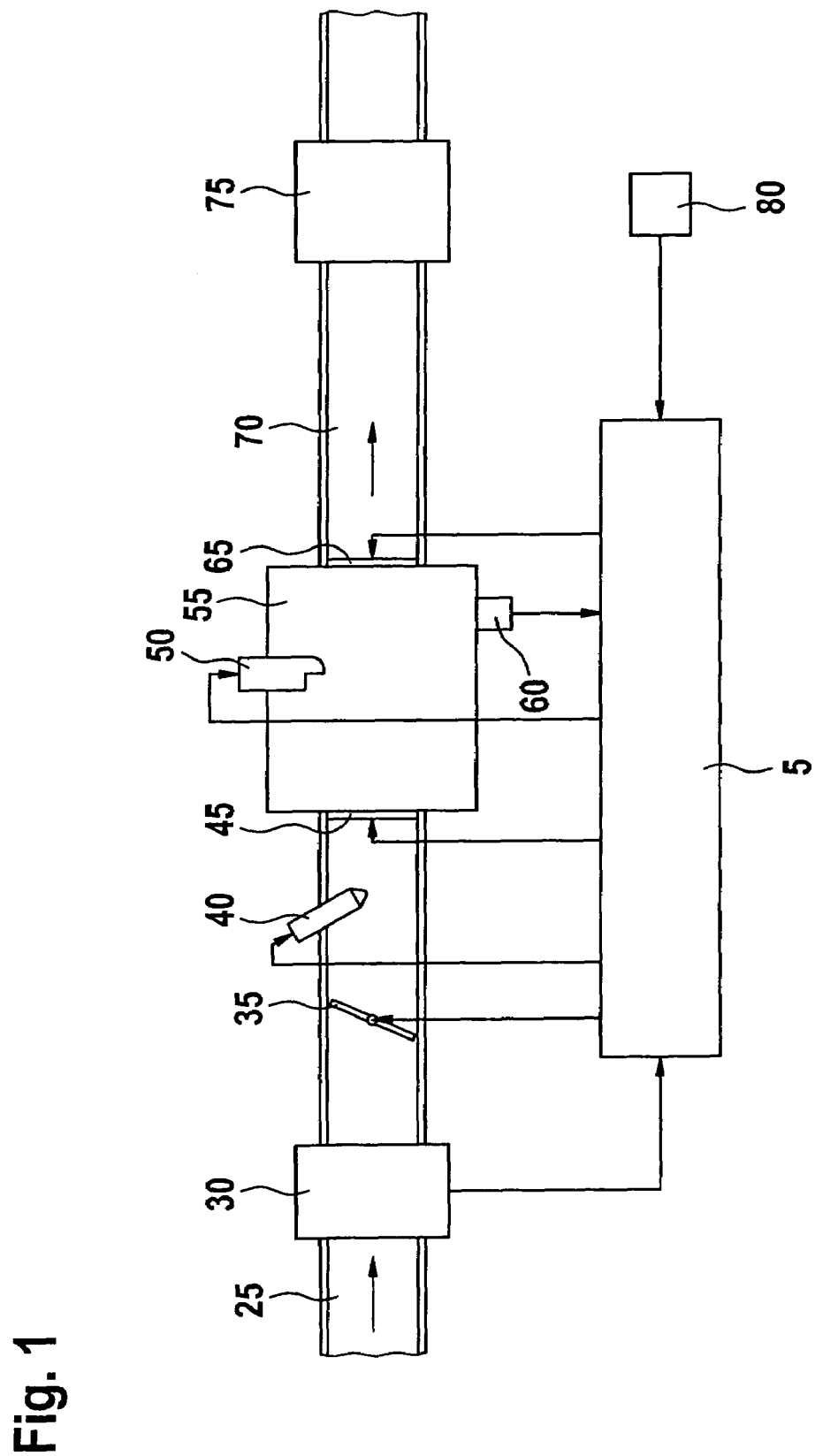
FIG. 1 shows a block diagram of an internal combustion engine.

In FIG. 1, 1 identifies an internal combustion engine, of a motor vehicle, for example. Internal combustion engine 1 includes a combustion engine 55, which may be implemented as a gasoline engine or as a diesel engine, for example. Fresh air is supplied to combustion engine 55 via an air supply 25. The flow direction of the fresh air in air supply 25 is identified by an arrow. An air mass meter 30, such as a hot-film air mass meter, which measures the fresh air mass flow supplied to combustion engine 55 and outputs the measured value to a device 5, which is implemented as an engine controller, for example, is situated in air supply 25. The measured value of the fresh air mass flow supplied may be used in this case as a variable which characterizes the load of combustion engine 55. A throttle flap 35, whose degree of opening is set by engine controller 5, in order to implement a driver command predefined by the driver of the vehicle at an accelerator pedal 80, for example, is situated in air supply 25 downstream from air mass meter 30 in the flow direction of the fresh air. The accelerator pedal setting of accelerator pedal 80 is also relayed to engine controller 5 and converted in engine controller 5 into a driver intent torque mifa to be implemented by engine 1. Alternatively, the driver intent torque may already be determined in accelerator pedal 80 and an assigned accelerator pedal module and relayed to engine controller 5. An injector 40, which is also activated by engine controller 5 in order to set a predefined air/fuel mixture ratio, for example, which is determined by a lambda sensor (not shown in FIG. 1) in an exhaust system 70 of engine 1, is situated in air supply 25 downstream from throttle flap 35 in the flow direction of the fresh air. Alternatively, the fuel may also be injected directly into a combustion chamber of combustion engine 55. An intake valve 45, via which the fresh air and the injected fuel are introduced into a combustion chamber of combustion engine 55, is situated in air supply 25 downstream from injector 40. Intake valve 45 is also activated by engine controller 5 in the example described, in order to set a predefined valve lift and a predefined opening time, for example. The air/fuel mixture is ignited in the combustion chamber of combustion engine 55 by a spark plug 50, engine controller 5 predefining the ignition instant of spark plug 50 as a function of the operating state of engine 1, for example. Furthermore, a rotational speed sensor 60 is provided which measures the engine speed of combustion engine 55 and relays the measured value to engine controller 5. The exhaust gas produced during the combustion of the air/fuel mixture is expelled from the combustion chamber of combustion engine 55 into exhaust system 70 via an exhaust valve 65. Exhaust valve 65 is also activated by engine controller 5 in the example described, in order to set a predefined valve lift and a predefined opening time, for example. The flow direction of the exhaust gas to exhaust system 70 is also identified by an arrow in FIG. 1. A catalytic converter 75 for treating exhaust gas may be situated in exhaust system 70, as in FIG. 1.

Figure 2:
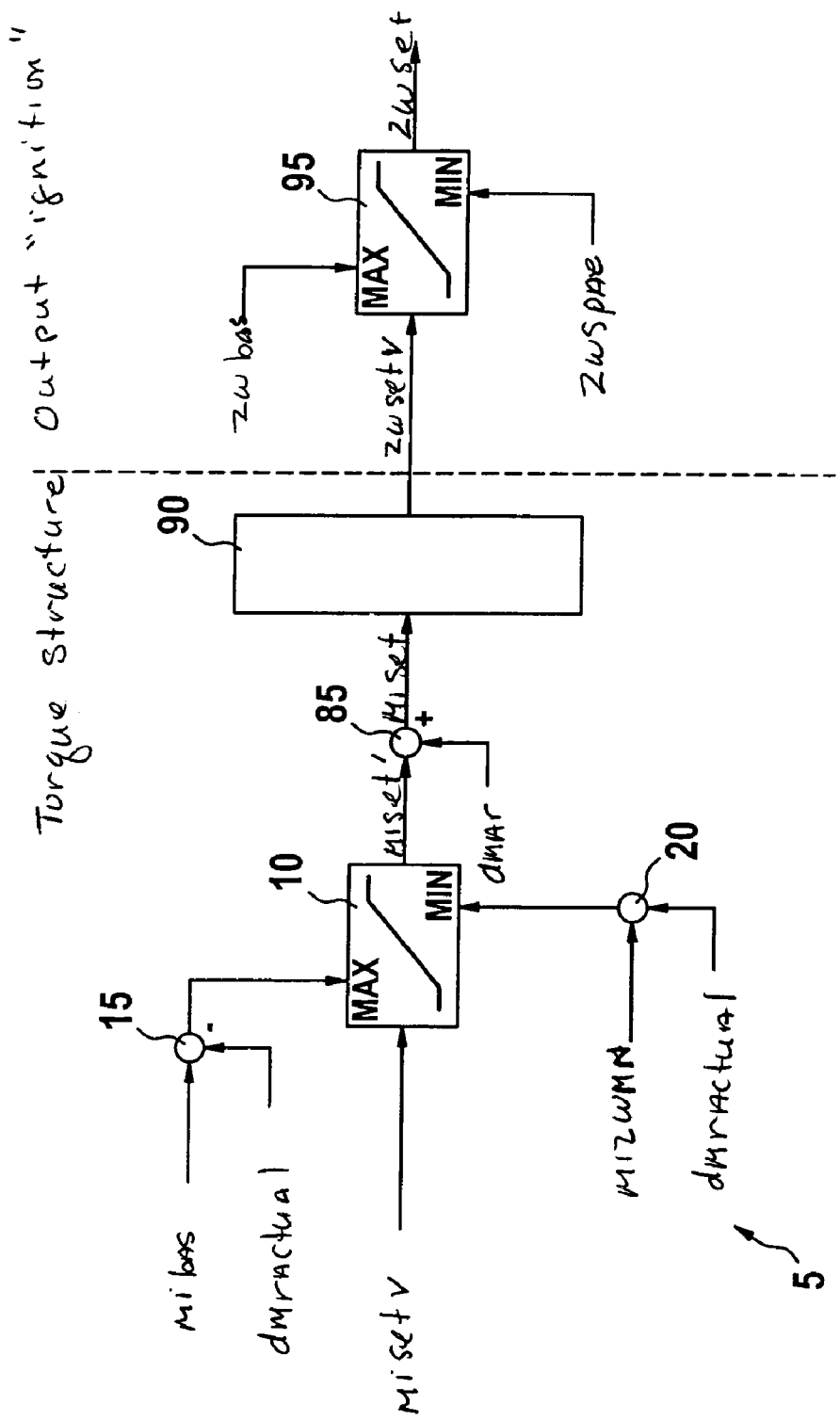
FIG. 2 shows a flow chart to explain the method according to the present invention the device according to the present invention.

A flow chart which is used to explain the method according to the present invention and the device according to the present invention is shown in FIG. 2. The flow chart may be implemented in engine controller 5 using software and/or hardware. In this case, the flow chart provides a manipulated variable, such as an ignition angle, in order to implement a predefined value for an output variable of engine 1. The output variable may be, for example, a torque, a power, a charge of the combustion chamber, or a variable derived therefrom. In the following, it is to be assumed for exemplary purposes that the output variable is a torque. From driver intent torque mifa and possibly further torque requests from vehicle functions, such as a transmission controller, a vehicle-speed controller, a traction control system, or the like, engine controller 5 coordinates, in a way known to those skilled in the art, a resulting setpoint torque misetv before a subsequent torque delimitation by a torque limiter 10. Resulting setpoint torque misetv is then supplied to torque limiter 10 and delimited to a predefined range there.

The predefined range is given its upper limit by a base torque mibas, which is reached at a most advanced possible ignition angle zwbas for the current operating point of engine 1, and is given its lower limit by a minimum torque mizwmn, which is reached at a most retarded possible ignition angle zwspae for the current operating point of engine 1. Of this predefined range, at least a part is now excluded according to the present invention, in which the setpoint value and therefore also the actual value of the torque of engine 1, for example, the internal torque output at the crankshaft by combustion engine 55, may not intervene in at least one operating state of engine 1. For this purpose, depending on this operating state, base torque mibas may be reduced in a subtraction element by a reserve torque value dmractual, in order to produce a reduced maximum value for the predefined range, or the minimum torque may be increased by reserve torque value dmractual in a first addition element 20, in order to produce an increased minimum torque for the predefined range. A part of the predefined range for the torque is thus blocked and/or forbidden. Setpoint torque miset' delimited in this way, possibly by torque limiter 10, is additively linked in a second addition element 85 to a possibly existing dynamic torque request dmar, of an anti-jolt function, for example, in order to produce a finally resulting setpoint torque miset after possibly completed delimitation.

This resulting setpoint torque miset is fed to a conversion unit 90 and converted there into an assigned value for a manipulated variable, the ignition angle in this example. A setpoint value zwsetv for the ignition angle prior to delimitation thus results at the output of conversion unit 90. Setpoint value zwsetv for the ignition angle prior to the delimitation is fed to an ignition angle limiter 95 and delimited there by base ignition angle zwbas, i.e., the most advanced possible ignition angle, and by the most retarded possible ignition angle zwspae. Resulting setpoint value zwset for the ignition angle results at the output of ignition angle limiter 95.

The present invention will be explained in the following on the basis of different examples.

Figures 3A, 3B, 3C:
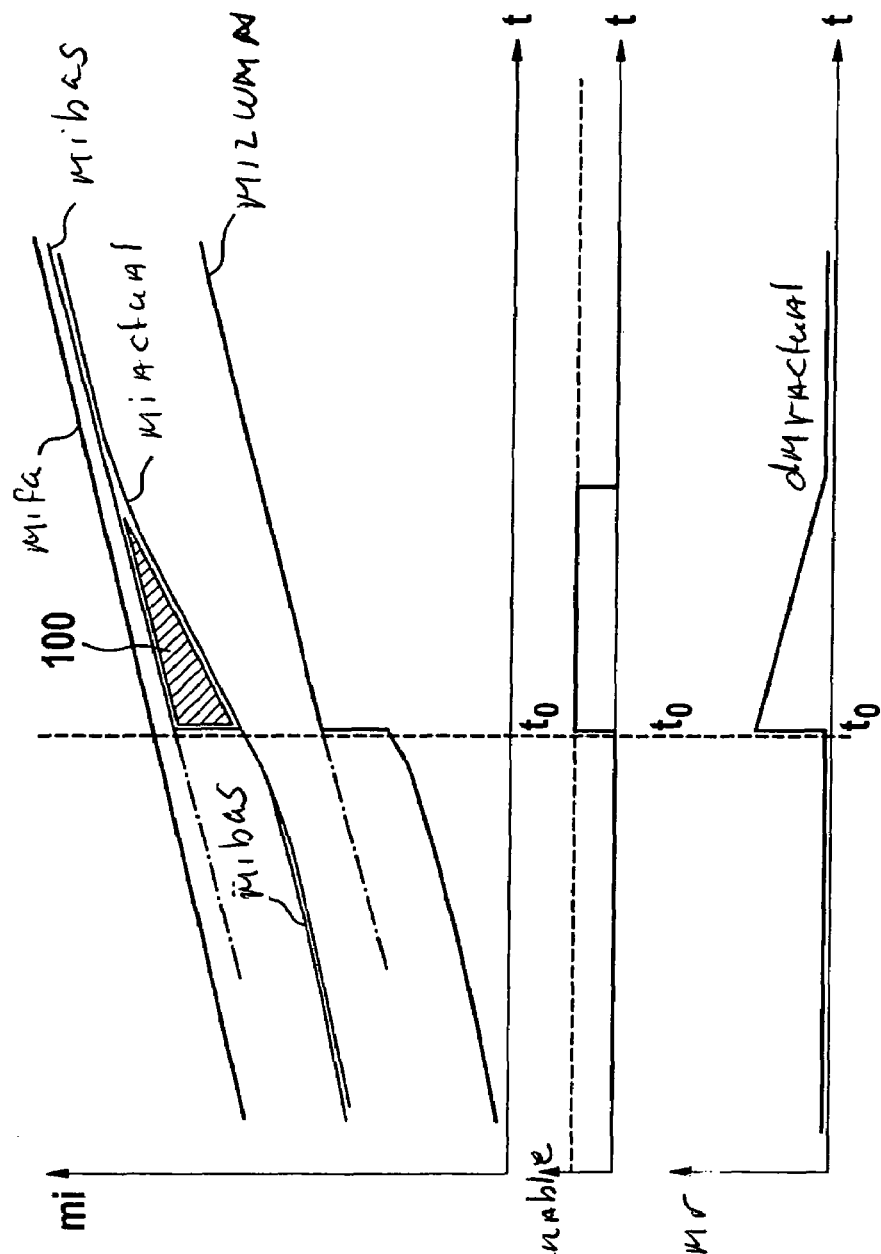
FIG. 3a) shows a first curve of a torque over time.
FIG. 3b) shows a first curve of an ignition angle release over time.
FIG. 3c) shows a first curve of a blocked torque range over time.

In FIG. 3a), internal torque mi is plotted over time t. In this case, it is to be assumed for exemplary purposes that driver intent torque mifa from engine controller 5 was selected as setpoint torque misetv before the delimitation. This rises monotonously with increasing time t. It is above the predefined range for the settable internal torque. By increasing the charge, i.e., through increasing opening of throttle flap 35, the predefined range which is delimited by the possible ignition angle settings is approximated and/or matched to driver intent torque mifa. In particular, the upper torque setting limit, which corresponds to base torque mibas, follows driver intent torque mifa with a delay because of the inertia of air supply 25 in the region of the intake manifold between throttle flap 35 and intake valve 45. At an instant t0, engine controller 5 causes a valve lift changeover of intake valve 45, from the small valve lift into the large valve lift, for example, through which a sudden rise of the charge occurs, so that the predefined range for the internal torque, i.e., both base torque mibas and minimum torque mizwmn, is displaced suddenly in the direction toward driver intent torque mifa. This would result in an undesired jolt, which would be perceivable by the driver. Therefore, a reserve torque value dmractual corresponding to the expected torque jump of the predefined range is produced by engine controller 5 at instant t0, as shown in FIG. 3c), and implemented by an ignition angle release zwenable, introduced at the latest at instant t0 as shown in FIG. 3b), through corresponding sudden retarding of the ignition angle. The sudden charge increase is therefore compensated for in a torque-neutral way through corresponding retarding of the ignition angle, so that the jolt described does not occur.

Accordingly, actual torque miactual, which was approximately equal to base torque mibas at instant t0 because of the matching to driver intent torque mifa, increases further at instant t0 without a jump, so that there is a noticeable difference between base torque mibas and actual torque miactual. This difference is shown cross-hatched in FIG. 3a) and identified with reference number 100. In this case, 100 represents a torque reserve within the predefined range for internal torque mi, which is blocked to internal torque mi. The reason for this is that at instant t0, reserve torque value dmractual jumps to a value which corresponds to the jump of the predefined range for internal torque mi. Reserve torque dmr is plotted over time t in this case in FIG. 3c). According to subtraction element 15 in FIG. 2, upper limit mibas-dmractual is thus reduced suddenly at instant t0 in torque limiter 10 from base torque mibas by the jump of reserve torque value dmractual. Actual torque miactual now follows torque upper limit mibas-dmractual without a jump. The ignition angle then does not correspond to the most advanced possible ignition angle. Reserve torque value dmractual may now be reduced linearly from instant t0 on until it reaches 0 using a ramp function or a filter, for example. This means that torque reserve 100 blocked for internal torque mi is correspondingly reduced, so that actual torque miactual may similarly be approximated to base torque mibas again by advancing the ignition angle. The ignition angle release may then be canceled out again at the earliest when actual torque miactual reaches base torque mibas, assuming the most advanced possible ignition angle is set.

The prediction of the jump of the predefined range for internal torque mi is shown by the dot-dash line in FIG. 3a). If engine controller 5 receives a request for a valve lift changeover derived from the driver command at accelerator pedal 80 to implement an acceleration intent, for example, an impending valve lift changeover is recognized in engine controller 5. The charge jump to be expected for the impending valve lift changeover is determined in engine controller 5 in the way known to those skilled in the art using a characteristics map, for example, as a function of the load and the engine speed, and possibly also the exhaust gas recirculation rate, if there is exhaust gas recirculation, and tank ventilation, if tank ventilation is provided, it being taken into consideration, of course, whether the changeover is from the small valve lift to the large valve lift or vice versa. The jump of internal torque mi to be expected for the impending valve lift changeover and therefore the jump to be expected of the predefined range for the internal torque and therefore the required jump of reserve torque value dmractual are then calculated by engine controller 5 in a way known to those skilled in the art using a characteristics map, for example, as a function of the established charge jump and the engine speed.

If driver intent torque mifa is now to increase abruptly in the time period beginning from instant t0, for example, this increase from resulting setpoint torque miset and therefore also from actual torque miactual is not executed by intervening in blocked torque reserve 100, i.e., blocked torque reserve 100 is not available to implement such a change of driver intent torque mifa. This is similarly true for an intervention of an idle-speed control of engine 1. Different behavior is shown in the example in FIG. 5a), in which the shape of the curve of driver intent torque mifa corresponds to that shown in FIG. 3a) and a valve lift changeover occurs at instant t0 in a corresponding way as in FIG. 3a), so that it occurs similarly to the jump upward of the predefined range for internal torque mi in FIG. 3a). Therefore, FIGS. 5b) and 5c) correspond to FIGS. 3b) and 3c), respectively, i.e., the same shape of the curve of reserve torque value dmractual over time t is implemented as in the exemplary embodiment in FIG. 3c). The prediction is indicated here in FIG. 5a) by the crosshatched continuous extension of the predefined range for the internal torque between minimum torque mizwmn and base torque mibas at times less than instant t0. In the case of the example in FIG. 5a), after instant t0, a dynamic torque requirement dmar of an anti-jolt function, for example, is added in second addition element 85 and therefore after the torque limitation to possibly limited setpoint torque miset and may therefore intervene within ignition angle limits zwspae and zwbas shown in FIG. 5a) in otherwise blocked torque reserve 100 and may therefore be implemented, as may be seen in the oscillating curve of actual torque miactual, which intervenes in crosshatched region 100 shown in FIG. 5a).

Figure 4A:
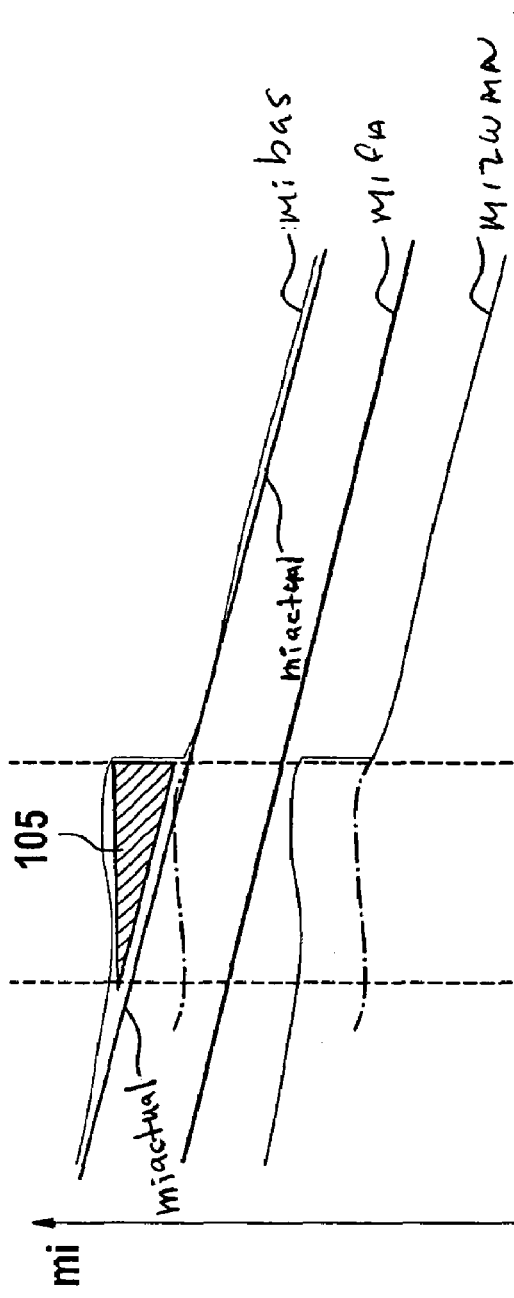
FIG. 4a) shows a second curve of a torque over time.

The case in which driver intent torque mifa is again selected by engine controller 5 as resulting setpoint torque misetv before torque limitation, is dealt with in the example shown in FIGS. 4a) through 4c). This value falls monotonously over time t as shown in FIG. 4a) and lies in the predefined range for internal torque mi, so that it is applied unchanged to the output of second addition element 85. Actual torque miactual is matched to driver intent torque mifa for optimum consumption using approximately the most advanced possible ignition angle, i.e., using base ignition angle zwbas, and therefore approximately corresponding to base torque mibas. Base torque mibas follows the reduction of driver intent torque mifa with a delay. Minimum torque mizwmn and therefore the entire predefined range for the internal torque are also lowered accordingly. At first instant t1 at the latest, engine controller 5 recognizes a request for a valve lift changeover, for example, to approximate base torque mibas to driver intent torque mifa and therefore to cause an approach of actual torque miactual to driver intent torque mifa. In this case, the predefined range for internal torque mi is to drop suddenly due to the valve lift changeover, for example, by changing over from the large valve lift of intake valve 45 to the small valve lift of intake valve 45. In the event of such a valve lift changeover, depending on the engine speed, a sudden charge reduction and therefore a sudden reduction of internal torque mi may occur. This means that the predefined range for internal torque mi and therefore both base torque mibas and minimum torque mizwmn are also reduced suddenly. Since actual torque miactual approximately corresponds to base torque mibas, it would also be reduced suddenly upon the sudden reduction of the predefined range for internal torque mi, which could cause an undesired jolt of the vehicle.

Figure 4B:
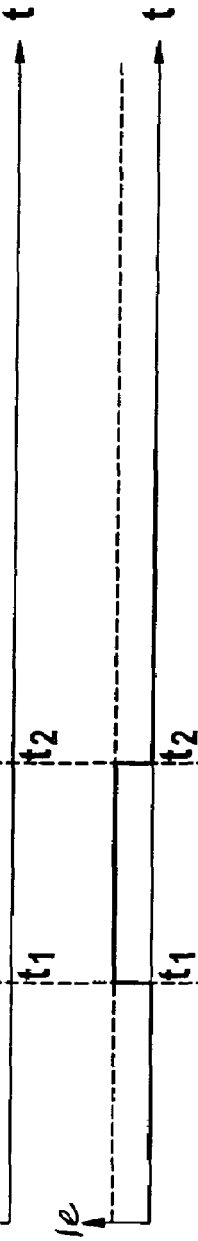
FIG. 4b) shows a second curve of an ignition angle release over time.
Figure 4C:
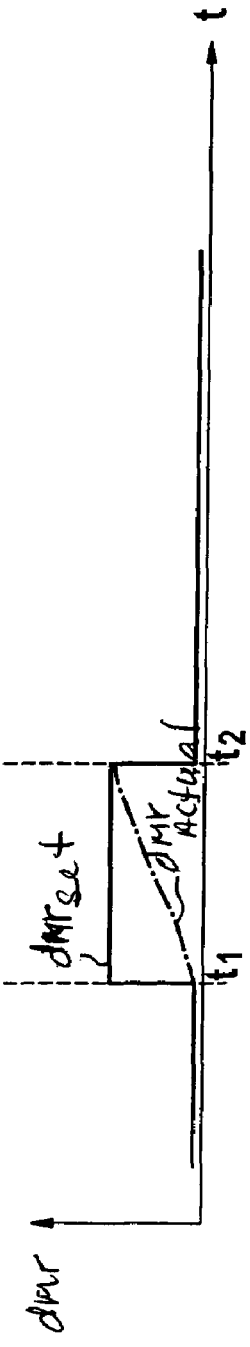
FIG. 4c) shows a second curve of a blocked torque range over time.

Therefore, an enable of the ignition angle shift in accordance with the rising pulse of signal zwenable in FIG. 4b) is initiated at first instant t1 at the latest, and starting at first instant t1, for the torque jump of the predefined range for internal torque mi expected by the prediction upon the valve lift changeover, a setpoint value dmrset for the reserve torque value corresponding to this torque jump is predefined. At a second instant t2 following first instant t1, actual value dmractual of reserve torque value reaches setpoint value dmrset. This takes place, for example, through appropriate opening of throttle flap 35. In this way, a second torque reserve 105 is formed, which is shown crosshatched in FIG. 4a) and prevents further reduction of base torque mibas and minimum torque mizwmn between first instant t1 and second instant t2, which would otherwise result in matching to driver intent torque mifa because of increasing closing of throttle flap 35. Nonetheless, second torque reserve 105 is a taboo range for driver intent torque mifa to be implemented and therefore also for actual torque miactual, which is matched thereto, as results on the basis of the subtraction of actual value dmractual of the reserve torque value from base torque mibas in subtraction element 15 and the upper limit in torque limiter 10 resulting therefrom. At second instant t2, setpoint value dmrset of the reserve torque value is reached by actual value dmractual, so that engine controller 5 may enable the valve lift changeover at second instant t2, so that the corresponding jump of the predefined range for internal torque mi may occur at second instant t2, as shown in FIG. 4a).

Therefore, second torque reserve 105 is completely consumed by this jump at second instant t2, and setpoint value dmrset and actual value dmractual of the reserve torque value also jump to 0, so that the upper limit of the predefined range for internal torque mi is again coincident with base torque mibas and is approximately coincident with actual torque miactual. At second instant t2, base torque mibas and minimum torque mizwmn and therefore the predefined range for internal torque mi thus suddenly fall with the reduced charge. Actual torque miactual therefore does not experience a jump during the valve lift changeover and follows torque upper limit mibas—dmractual, so that the driver does not feel any jolt of the vehicle. From second instant t2, ignition angle enable zwenable may then be reset again, since actual torque miactual is again implemented for optimum consumption from second instant t2 using most advanced possible ignition angle zwbas. A dynamic torque request dmar of an anti-jolt function, for example, may also engage in otherwise blocked second torque reserve 105 through addition in second addition element 85 in the example in FIG. 4a).

The method according to the present invention may also be used for steady-state procedures, when no jump occurs in the charge. If a torque reserve is requested and set for catalytic converter heating, for example, the displacement of the operating point of internal combustion engine 1 is compensated for in a torque-neutral way through an ignition angle correction so that the resulting actual torque remains constant. The resulting torque setting range and/or the predefined range for internal torque mi as a function of the ignition angle thus adjusted may also be used in this case as the blocked torque range and therefore prevent the existing torque reserve from being used up, in order to ensure the most rapid possible heating of catalytic converter 75 and prevent interruption of the catalytic converter heating function due to advancing of the ignition angle.

The torque range blocked during the valve lift changeover and/or the catalytic converter heating function results in a blocked ignition angle range in the examples described.

The ignition angle was described as the manipulated variable for implementing the requested torque reserve and/or resulting setpoint torque miset. Alternatively, of course, another manipulated variable, such as the injection duration, may be set in a similar way in order to implement the requested torque reserve and/or resulting setpoint torque miset.

Through the method according to the present invention and the device according to the present invention, smoothing of the torque jump in regard to actual torque miactual in specific operating states of engine 1, the valve lift changeover, for example, is achieved by influencing the torque setting limits for torque limiter 10. In this way, jumps of actual torque miactual are avoided. In the case of the catalytic converter heating function, catalytic converter heating which is as rapid and free of interruptions as possible is ensured through the method according to the present invention and the device according to the present invention.

In general, the method described according to the present invention and the device described according to the present invention may be applied in all operating states of internal combustion engine 1 in which a charge jump may be predicted, in order to avoid a torque jump associated therewith.

What is claimed is:

1. A method for operating an internal combustion engine comprising:
   setting an output variable of the engine within a predefined range; and
   blocking at least a part of the predefined range for setting the output variable as a function of at least one operating state of the engine.

2. The method according to claim 1, wherein the engine is of a vehicle.

3. The method according to claim 1, further comprising forming the at least one operating state by a catalytic converter heating function.

4. The method according to claim 1, further comprising forming the at least one operating state by a valve lift changeover.

5. The method according to claim 1, further comprising, if the at least one operating state occurs, increasing a reserve for the output variable, and blocking the reserve for the setting of the output variable.

6. The method according to claim 5, further comprising one of decreasing and increasing the reserve as a function of a shape of a curve of the output variable over time.

7. The method according to claim 6, wherein the reserve is decreased using one of a ramp function and a filter.

8. The method according to claim 1, further comprising predicting the at least one operating state.

9. The method according to claim 1, further comprising permitting a dynamic intervention of the output variable in the blocked part of the predetermined range for the output variable.

10. The method according to claim 1, further comprising limiting a manipulated variable for implementing a setpoint value for the output variable to a predefined range.

11. A device for operating an internal combustion engine comprising:
    means for limiting an output variable of the engine to a predefined range; and
    means for blocking at least part of the predefined range for setting the output variable as a function of at least one operating state of the engine.

12. The device according to claim 11, wherein the engine is of a vehicle.

* * * * *